(12) United States Patent
Verdianz et al.

(10) Patent No.: US 7,674,839 B2
(45) Date of Patent: Mar. 9, 2010

(54) METHODS FOR THE PRODUCTION OF POLYMER CARRIER MATERIALS BASED ON CARBON HYDRATE-BIS(METH)ACRYL-AMIDES

(75) Inventors: Thomas Verdianz, Vienna (AT); Heinrich Gruber, Vienna (AT); Simone Knaus, Vienna (AT); Alexander Poschalko, Birsfelden (CH)

(73) Assignee: Technische Universitat, Vienna (AT)

( * ) Notice: Subject to any disclaimer, the term of this patent is extended or adjusted under 35 U.S.C. 154(b) by 601 days.

(21) Appl. No.: 11/631,236

(22) PCT Filed: Jun. 24, 2005

(86) PCT No.: PCT/AT2005/000230

§ 371 (c)(1),
(2), (4) Date: Dec. 29, 2006

(87) PCT Pub. No.: WO2006/000008

PCT Pub. Date: Jan. 5, 2006

(65) Prior Publication Data

US 2008/0300383 A1    Dec. 4, 2008

(30) Foreign Application Priority Data

Jun. 29, 2004    (AT)    ............... A 1100/2004

(51) Int. Cl.
*C08F 236/20* (2006.01)
*C07H 15/04* (2006.01)
*C07H 15/12* (2006.01)
*C08J 9/00* (2006.01)
*C08F 251/00* (2006.01)

(52) U.S. Cl. ............... 521/88; 521/82; 521/98; 536/55.1; 536/22.1; 536/18.7; 536/55; 526/238.23; 526/306; 525/54.3; 527/312; 527/313; 527/314

(58) Field of Classification Search ............... 525/54.3; 526/238.2, 238.23, 306; 527/312–314
See application file for complete search history.

(56) References Cited

U.S. PATENT DOCUMENTS 3,420,852 A    1/1969    Black et al    ............... 260/340.7
3,463,790 A *  8/1969    Black et al. ............... 549/448
4,060,506 A * 11/1977    Verbanac ............... 526/238.22
5,278,270 A *  1/1994    Kozulic et al. ............... 526/304
5,939,466 A *  8/1999    Bachmann et al. ............... 523/106
6,018,033 A *  1/2000    Chen et al. ............... 536/4.1
6,552,103 B1* 4/2003     Bertozzi et al. ............... 523/106

FOREIGN PATENT DOCUMENTS

EP    0 367 886 A1    5/1990
JP    57202309 A  *  12/1982

OTHER PUBLICATIONS

CAPlus Accession No. 1969:513486 and Registry File for RN 28723-66-2.*
Whistler (1-Acrylamido-1-deoxy-D-glucitol, 1-Deoxy-1-methacrylamido-D-glucitol and Their Polymerization. Journal of Organic Chemistry. 1953. 26, p. 1583-1588.).*
Japanese Abstract of JP 57-202309.*
Patent Abstracts of Japan: vol. 011, No. 332 (C-455), Oct. 29, 1987 & JP 62 116617 A (*Dainippon Ink & Chem Inc*), May 28, 1987.
W. N. Haworth et al: "Some Derivatives of Simple Carbohydrates Containing Unsaturated Substituents" *Journal of the Chemical Society, Chemical Society.* Letchworth, GB, 1946, pp. 488-491.

* cited by examiner

*Primary Examiner*—Randy Gulakowski
*Assistant Examiner*—Brieann R Fink
(74) *Attorney, Agent, or Firm*—Daniel A. Monaco; Drinker Biddle & Reath LLP

(57) ABSTRACT

The invention relates to methods for the production of polymer carrier materials for solid phase synthesis, particularly for peptide synthesis. (Meth)acrylamide derivatives based on carbon hydrates, which can also contain other protective groups, are polymerized by means of suspension polymerization in an aqueous phase, optionally with the addition of pore-forming additives, and subsequently the protective groups are fully or partially cleaved. It is thus possible to obtain polymer carriers whose morphology (particle size, porosity), degree of cross-linking and swelling capability in aqueous and organic media can be adjusted in a targeted manner and whose reactive groups offer multiple opportunities for the immobilization of anchor groups and protective groups. The hydroxyl groups of the polymer carrier can be activated according to usual methods of solid phase synthesis.

8 Claims, No Drawings

METHODS FOR THE PRODUCTION OF POLYMER CARRIER MATERIALS BASED ON CARBON HYDRATE-BIS(METH)ACRYL-AMIDES

The invention relates to a method for producing novel polymeric carrier materials based on (meth)acrylamide-substituted carbohydrates as well as their use in affinity chromatography or solid phase synthesis.

Since solid-phase synthesis was introduced by R. B. Merryfield (R. B. Merrifield, J. Chem. Soc. 85, 2149 (1963)), automated solid-phase synthesis of peptides, oligonuceotides and oligosaccharides have been applied to a continuously increasing extent. The introduction of synthesis robots for a simultaneous, multiple synthesis of peptides constituted the next step in this development. In addition, polymeric carriers have gained considerable importance in the field of affinity chromatography (P. Cuatrecasas et al., Proc. Natl. Acad. Sci. USA 61, 636 (1968)) and the immobilization of enzymes or cells.

In recent years, the field of application of polymeric carrier materials has been extended to other areas by the introduction of the concept of combinatorial chemistry. Today, combinatorial synthesis of libraries of substances on a solid phase is a key technology in the pharmaceutical industry for developing and optimizing novel active agents. This principle of synthesis has also been extended to the production of a multitude of classes of organic substances (Combinatorial Chemistry, G. Jung (ed.), Wiley VCH, Weinheim (1999)). Virtually all standard reactions of organic chemistry may be conducted on solid phase with appropriate carrier materials, anchor and protective groups. Consequently, combinatorial synthesis has also been increasingly used in other research areas such as material research and catalyst development.

The advantages of solid-phase synthesis mainly lie in the implementation of reactions and a simple product work-up, so that the basic requirements for automateable synthesis are met.

This enormous extension of solid phase chemistry also led to a strong increase in the need for novel multi-purpose carrier materials.

The structure, morphology, particle size, hydrolytic and thermal resistance of polymeric carriers are very important in all solid-phase syntheses because these determine their compatibility with organic or aqueous reaction media as well as the accessibility of reactive groups. Consequently, selecting the correct carrier material is decisive for the success of a solid-phase synthesis. Furthermore, in the area of affinity chromatography or immobilization of bioactive components, biocompatibility and wettability with aqueous reaction media are important.

In most cases, carriers based on styrene/divinylbenzene are used, which are, however, rather disadvantageous because of their poor swelling properties when used in aqueous media (W. Tegge. R. Frank, J. Peptide Res. 49, 355 (1997)). Therefore, polar carriers have been developed, such as polyethylene glycol (PEG) modified polystyrene/divinylbenzene (E. Bayer, Angew. Chem. 103, 117 (1991), G. Barany et al., U.S. Pat. No. 5,235,028, WO 92/04384 (1992)), poly(ethyleneglycol-bis-methacrylate) (G. Barany U.S. Pat. No. 5,656,707, M. P. Meldal U.S. Pat. No. 5,352,756) as well as bead-shaped carriers based on cellulose (D. R. Englebretsen, Int. J. Peptide Protein Res. 40, 487 (1992)) and agarose (G. P. Vlasov et al., Zh. Obsh. Khim. (Engl. Trans.) 56, 1450 (1987), C. R. Nakaie, WO 01/46216 A2, 28. June 2001). In addition, polar carriers based on mixtures of sucrose methacrylate (H. Gruber, Monatsh. Chem. 112, 273-85 (1981)) and glucose monomethacrylate (T. Rohr et al., Acta Polym. 50, 286-292 (1999)) have been described.

These carrier materials have different disadvantages. For example, the length of polyethylene glycol (PEG) chains is difficult to control during polystyrene modification, additional cross-linking sites are formed, and reactions on these PEG-PS resins proceed very slowly with increasing molecular weight of the PEG.

With carriers based on natural carbohydrates such as agarose or cellulose, the morphology (pore diameter, interior surface, particle size) is predetermined and may only be controlled to a very limited extent, and their mechanical stability is usually insufficient for continuous column operation. Sucrose methacrylate carriers are obtained by precipitation polymerization and are only slightly cross-linked, which results exclusively in various types of gels. Since the low-substituted monomer mixtures are water-soluble, inverse suspension polymerization is possible, but the possibilities of controlling reactions are very limited with this method because most water-compatible pore-forming agents used for controlling morphology have a strong influence on the solubility of the monomer mixtures and thus also make it impossible to control the degree of cross-linking.

A further serious disadvantage of these carriers is their construction via ester bonds. This makes them per se susceptible to hydrolysis and may lead to the destruction of the carrier when used in acidic or basic media, which seriously limits their applicability, especially in the area of solid-phase synthesis.

The present invention aims to provide polymeric carriers, the morphology (particle size, porosity), degree of cross-linking as well as swellability in aqueous and organic media of which may be specifically adjusted during their production, the reactive groups of which provide diverse possibilities to the immobilization of anchor and protective groups, and which are thermally and hydrolytically stable.

It has been found that this aim can be achieved with (meth)acrylamide-substituted carbohydrate derivatives.

The object of the present invention is a method for producing polymeric carriers based on polyacrylic or polymethacrylic amides of monosaccharides, characterized in that acryl or methacrylamide derivatives of carbohydrates with protected HO groups of the general formula I

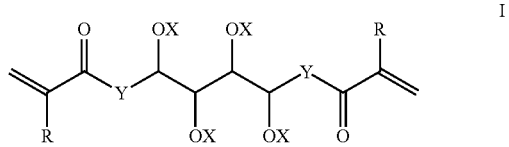

wherein R represents hydrogen or a $CH_3$ group, and at least one X represents a group $-CO-CH_3$, $-CH_2-C_6H_5$, $-Si(CH_3)_3$ or at least two groups X together represent the radical

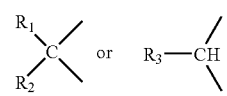

wherein $R_1$ and $R_2$ independently represent hydrogen, an alkyl radical having 1 to 10 C atoms or an aromatic radical, $R_3$ represents a cycloalkyl radical having 4 to 10 C atoms or a phenyl radical, and the remaining X represent hydrogen, wherein Y represents the radical —NH—, —CH$_2$—NH— or —CO—NR$_4$—Z—NR$_5$—, wherein Z represents a radical —(CH$_2$)$_n$—, with n=2-20, a radical —(CH$_2$—CH$_2$—O)$_x$—CH$_2$—CH$_2$—, with x=1-10, a cycloalkylidene radical having 4-10 C atoms or an aromatic radical having 6 to 30 C atoms, and wherein R$_4$ and R$_5$ independently represent hydrogen, an alkyl radical having 1 to 10 C atoms or an aromatic radical, are polymerized, optionally in the presence of pore-forming additives, followed by partial or complete cleavage of the protective groups from the cross-linked carrier thus obtained.

Starting materials for the production of bis(meth)acrylamides of formula I are, for example, known diamines based on carbohydrates such as 1,6-diamino-1,6-dideoxy-2,4:3,5-di-O-methylene glucitol, mannitol or galactitol (U.S. Pat. No. 3,463,790 (1969), Haworth et al., J. Chem. Soc. 155 (1944)).

Preferred according to the invention are protected carbohydrate diamines with protective groups which may be separated under mild conditions such as 1,6-diamino-1,6-dideoxy-2,3:4,5-di-O-isopropylidene galactitol or 1,6-diamino-1,6-dideoxy-2,3:4,5-di-O-benzylidene galactitol. These diamines may be produced from the corresponding 1,6-dichloro-derivatives according to U.S. Pat. No. 3,463,790 (1969), which results in relatively low overall yields, though. By means of a novel way of synthesis, these diamines may also be obtained from an also novel galactaric acid dimethyl ester in an overall yield of 64%.

Preferred according to the invention are novel carbohydrate diamines produced by reacting glycaric acid dialkyl esters with excessive diamines. For example, galactaric acid dimethyl ester may first be protected with 2,2-dimethoxypropane, whereupon the 2,3:4,5-di-O-isopropylidene galactaric acid dimethyl ester thus obtained is converted into the 2,3:4, 5-di-O-isopropylidene galactaric acid bis(2-aminoethyl) amide. By varying the diamines used in this synthesis, a multitude of novel carbohydrate diamines are accessible easily and in high yields. Preferred are aliphatic diamines having 2 to 20 C atoms such as ethylenediamine, hexamethylenediamine, 1,12-diaminododecane, 1,2-bis(aminoethoxy)ethane or piperazine. By appropriately selecting the diamines, the properties of the resulting carbohydrate diamines and thus of the polymeric carriers may also be controlled. If, for example, 1,12-dodecanediamine is used in the synthesis of carbohydrate diamines, methacryloylation and polymerization results in a carrier the HO groups of which are more easily accessible for further reactions due to low steric hindrance. Aromatic radicals, on the other hand, increase the thermal stability of the polymeric carrier.

Instead of galactaric acids, other known carbohydrate-based esters may also be used, for example glucaric acid esters. According to the invention, the glycaric acid alkyl ester may also be provided with other protective groups well known in carbohydrate chemistry, such as acetate, trimethylsilyl, benzylidene or cyclohexylidene groups. However, the reaction with diamines can also be conducted with unprotected glycaric acid alkyl esters.

Subsequently, the protected carbohydrate diamines are reacted with (meth)acrylic acid derivatives to form methacrylamides. For this purpose, (meth)acrylic acid, its esters, (meth)acrylic acid chloride or methacrylic acid anhydride may be used. For producing bis(meth)acrylamides, the carbohydrate diamine is used with the (meth)acrylic acid derivative in a molar ratio of at least 1:2; lower molar ratios result in mixtures of mono- and bis(meth)acrylamides, which may also be used in polymerization according to the invention.

From these monomers or monomer mixtures, the cross-linked polymeric carriers may be produced by, for example, suspension polymerization in aqueous media. Furthermore, by adding appropriate pore-forming agents (porogenic agents), morphology can be specifically controlled. By varying the degree of cross-linking and/or the pore-forming agent, gel types, micro- or macroporous carriers may be produced in this way.

The monomer mixture is dissolved in a water-immiscible solvent, a pore-forming agent such as toluene or n-octanol can be added (wherein the pore-forming agent may at the same time act as solvent for the monomer mixture), and after addition of a radical initiator and a suspension stabilizer, it is polymerized with stirring in an aqueous suspension. The polymerization temperature is determined by the half-life of the initiator used. The obtained polymer particles, the size of which can be controlled by means of the stirring rate, are separated by filtration, washed several times with appropriate solvents, and dried. The polymers thus obtained are hydrophobic because of the protective groups still contained and are not swellable in water. For cleaving the protective groups, the polymer particles are treated with appropriate reagents, for example, in the case of isopropylidene-protected monomers, with trifluoroacetic acid or acetic acid, in the case of acetylated monomers by means of a mild alkaline treatment for selectively cleaving the acetyl groups (e.g. with 0.02 N sodium methylate solution in methanol). This results in polymeric carriers with hydroxyl groups that guarantee compatibility with aqueous media and moreover may serve as anchor groups in solid-phase syntheses.

The polymerization of monomers according to the invention may also be conducted in the presence of other monomers such as (meth)acrylic acid, (meth)acrylic esters, styrene, vinyl acetate, N-vinylpyrrolidone and other known monomers.

Preferred are N-methyl-N-((2,2-dimethyl-1,3-dioxolane-4-yl)methyl)acrylamide, N-methyl-N-((2,2-dimethyl-1,3-dioxolane-4-yl)methyl)methacrylamide, 2-hydroxyethyl acrylate, 2-hydroxyethyl methacrylate, ethylene glycol dimethacrylate, ethylene glycol diacrylate, diethylene glycol monoacrylate, glycidyl acrylate, glycidyl methacrylate, N,N-dimethylaminoethylmethacrylate, acrylamide, methacrylamide, N-methylol acrylamide, itaconic acid, pentaerythritol triacrylate and tetraacrylate.

The object of the invention thus also comprises polymeric carriers that, apart from other monomer units, contain structural elements of formula II

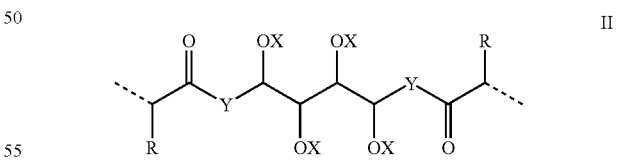

wherein R, X and Y have the meaning indicated for formula I.

For use in solid-phase synthesis, the carriers according to the invention may be activated via the HO groups according to known methods. In the solid-phase synthesis of peptides, for example, high loads may be achieved by a direct condensation of amino acids to the HO groups of the carriers. If strong acids such as trifluoroacetic acid are used in solid-phase synthesis, this may in some cases result in the undesirable separation of peptides from the polymeric carrier. In this case, it is useful to introduce amino groups into the carrier before the first amino acids are coupled and to protect the remaining HO groups. By activation with 1,1-carbonyl diimidazole, bromine cyanide or epichlorhydrin and subsequent coupling of 1,6-diaminohexane, for example, loads of up to 550 or 750 µmol/g may be achieved. In the same way, an activation via a Mitsunobu reaction and subsequent coupling with glycin and ε-amino-caproic acid results in an amino group content of up to 550 µmol/g.

With the polymeric carriers according to the invention, the synthesis of peptides may, for example, also be conducted according to the fmoc double-coupling routine in dimethyl formamide using N-a-fmoc-protected amino acids, wherein benzotriazole-1-yl-oxy-tris(dimethylamino)phosphonium hexafluorophosphate (BOP) and N-hydroxy-benzotriazole (HOBt) may be used as condensation reagents and diisopropyl ethylamine (DIPEA) as the base.

EXAMPLES

Example 1 a) Production of Galactaric Acid Dimethyl Ester

To a suspension of 65 g of galactaric acid (0.31 mol) in 3800 ml methanol, 50 ml of concentrated sulfuric acid are added dropwise with vigorous stirring. The reaction mixture is heated to boiling for 30 minutes and stirred under reflux for further 14 hours. The clear, yellowish solution obtained is reduced to approximately 2000 ml and then cooled to 5° C., so that the diethyl ester crystallizes as a colorless solid. After aspiration of methanol, washing with diethyl ether and drying at 50° C. for five hours, 71.60 g (93% of theory) of pure galactaric acid dimethyl ester are obtained.

MW: 238.20; Mp. 197-199° C.; $R_f$ 0.82 (MeOH/CHCl$_3$): 1); $δ_H$ (200 MHz; DMSO-d$_6$): 5.02-4.69 (bs, 4H, OH), 4.29 (s, 2H, CH—CH—CO), 3.77 (s, 2H, CH—CH—CO), 3.63 (s, 6H, CH$_3$); $δ_C$ (200 MHz; DMSO-d$_6$): 174.38 (2C, CO), 71.48 (2C, CH—CH—CO), 70.55 (2C, CH—CH—CO), 51.77 (2C, CH$_3$).

b) Preparation of 2,3:4,5-di-O-isopropylidene galactaric acid dimethyl ester 70 g (0.29 mol) of galactaric acid dimethyl ester are provided together with 2.76 g (14 mmol) of anhydrous p-toluenesulfonic acid in 450 ml of freshly distilled 2,2-dimethoxypropane and refluxed for 12 hours with moderate stirring, during which time the initially colorless reaction mixture turns increasingly dark red. Then 2 g of anhydrous sodium carbonate are added to the reaction solution, the methanol formed is removed by distillation, and 2,2-dimethoxypropane is recovered by distillation. The residue is taken up in 250 ml of diethyl ether and washed twice with 150 ml each of saturated NaCl solution and once with water. The aqueous solutions are washed with 100 ml of diethyl ether, the combined organic extracts are dried over Na$_2$SO$_4$, and the ether is evaporated. After recrystallization from 500 ml of n-hexane and drying at 50° C., 78.46 g (85% of theory) of pure 2,3:4,5-di-O-isopropylene galactaric acid dimethyl ester are obtained.

MW: 318.33; Mp. 90.2-90.7° C.; $R_f$ 0.82 (n-hexane/ethyl acetate); $δ_H$ (200 MHz; CDCl$_3$): 4.60-4.53 (m, 2H, CH—CH—CO), 4.49-4.40 (m, 2H, CH—CH—CO), 3.76 (s, 6H, COO—CH$_3$), 1.45 (s, 6H, CH$_3$), 1.39 (s, 6H, CH$_3$); $δ_C$ (200 MHz; CDCl$_3$): 171.37 (2C, CO), 112.25 (2C, C$_q$), 78.94 (2C, CH—CH—CO), 75.72 (2C, CH—CH—CO), 52.52 (2C, COO—CH$_3$), 26.91, 25.87 (4C, CH$_3$).

c) Production of 2,3:4,5-di-O-isopropylidene galactaric acid bis(2-aminoethyl)amide 92.7 g (0.29 mol) of 2,3:4,5-di-O-isopropylene galactaric acid dimethyl ester are dissolved in methanol, and 195 ml (2.9 mol, d=0.895) of freshly distilled ethylene diamine are added dropwise over 5 minutes with stirring. The reaction mixture is heated to boiling for 2 hours, then cooled to room temperature, and stirred for further 4 hours. The obtained product mixture is separated from unreacted ethylene diamine and methanol using a rotary evaporator. The viscous, yellow, oily residue is transferred into 1500 ml of cold diethyl ether with vigorous stirring and stirred for 2 hours. The undissolved powdery 2,3:4,5-di-O-isopropylidene galactaric acid bis(2-amino-ethyl)amide is filtered off and washed with 3 portions of 100 ml ether. After 4 hours of drying at 50° C., the pure product is obtained in a yield of 92% (100.3 g).

MW: 374.44; $R_f$ 0.42 (CHCl$_3$/MeOH/NEt$_3$ 1:3:0.2); $δ_H$ (200 MHz; CDCl$_3$): 7.10-6.91 (bs, 2H, CONH), 4.72 (d, 2H, J=7.05, CH—CH—CO), 4.46 (d, 2H, J=6.85 CH—CH—CO), 3.35-3.22 (dt, 4H, J=6.07, 5.87 CONH—CH$_2$), 2.84-2.74 (t, 4H, J=5.87 CH$_2$—NH$_2$), 1.46 (s, 6H, CH$_3$), 1.39 (s, 6H, CH$_3$), 1.25-1.15 (bs, 4H, NH$_2$); $δ_C$ (200 MHz; CDCl$_3$): 171.06 (2C, CO), 110.75 (2C, C$_q$), 78.65 (2C, CH—CH—CO), 74.97 (2C, CH—CH—CO), 41.65 (2C, CONH—CH$_2$), 41.35 (2C, (2C, CH$_2$—NH$_2$), 26.69, 25.94 (2C, CH$_3$).

d) Preparation of 2,3:4,5-di-O-isopropylidene galactaric acid N,N'-bis-[2-(2-methylacrylamino)ethyl]amide A solution of 100 g of diamine 3 (0.27 mol), 242 mg (1.1 mmol) of 2,6-di-tert-butyl-4-methylphenol in 800 ml anhydrous pyridine is heated to 65° C. with stirring, and then methacrylic acid anhydride (92 g, 0.59 mol) is slowly added dropwise. The reaction mixture is stirred at 65° C. for further 4 hours, then 300 ml of water are added quickly and stirred for further 10 hours. The reaction mixture is extracted three times with ethyl acetate, the combined organic phases are washed twice with a saturated NaHCO$_3$ solution and twice with water, dried over Na$_2$SO$_4$, filtered and concentrated. After precipitation in 500 ml of n-hexane, filtration, washing with n-hexane and 4 hours of drying in vacuo, 113.1 g (82%) of pure dimethacrylamide are obtained.

MW: 510.59; $δ_H$ (200 MHz; CDCl$_3$): 7.27-7.07 (bs, 2H, C(CH$_3$)=CH$_2$—CONH), 6.81-6.61 (bs, 2H, CH—CONH), 5.69, 5.29 (2s, 4H, C(CH$_3$)=CH$_2$), 4.66 (d, 2H, J=7.04 Hz, CH—CH—CO), 4.37 (d, 2H, J=7.05 Hz, CH—CH—CO), 3.53-3.34 (m, 8H, CH$_2$), 1.90 (s, 6H, C(CH$_3$)=CH$_2$), 1.44, 1.38 (2s, 12H, CH$_3$); $δ_C$ (200 MHz; CDCl$_3$): 172.15 (2C, CO—C(CH$_3$)=CH$_2$), 168.98 (2C, CO—CH), 139.41 (2C, C(CH$_3$)=CH$_2$), 120.08 (2C, C(CH$_3$)=CH$_2$), 111.00 (2C, C$_q$), 78.45 (2C, CH—CH—CO), 74.82 (2C, CH—CH—CO), 40.09 (2C, CH—CONH—CH$_2$), 39.01 (2C, CH$_2$—NHCO—C(CH$_3$)=CH$_2$), 26.63, 25.92 (4C, CH$_3$), 18.50 (2C, C(CH$_3$)=CH$_2$).

e) Suspension Polymerization of 1d

| Charge: | aqueous phase: | 144 g water |
| | | 14.4 g sodium chloride |
| | | 0.23 g hydroxyethylcellulose (Tylose) |
| | organic phase: | 9.00 g monomer (see 1d) |
| | | porogenic agent (type and amount see Table 1) |
| | | 0.1 g azodiisobutyronitrile (AIBN) |

In order to displace oxygen from the reaction solutions, both phases are first purged with nitrogen for 10 minutes and then combined. The subsequent polymerization was conducted at 80° C. and a stirring rate of 350 rpm over 6 hours and in a nitrogen atmosphere. The obtained polymer particles are separated by filtration, washed with 1 l of water and 300 ml of methanol, then extracted on a soxhlet extractor for 12 hours with 150 ml of methanol, and finally dried in high vacuum to a constant weight.

Yields and properties of the polymer particles see Table 1.

f) Hydrolysis of the Isopropylidene Protective Groups 5 g of polymer particles from 1e) are suspended in 65 ml of 60% acetic acid, mechanically stirred for 4 hours at 60° C., then washed with 300 ml of water and 300 ml of methanol, extracted on a soxhlet extractor for 12 hours with 150 ml of methanol, and finally dried under high vacuum to a constant weight.

Yield: 5 g

TABLE 1

Suspension polymerization of monomer 1d

| Polymer | Porogenic agent | Ratio monomer-porogenic agent [g/g] | Yield [%] | BET surface area [m²/g] | Average pore radius [nm] | BJH pore volume [cm³/g] |
|---|---|---|---|---|---|---|
| P1 | n-butyl acetate | 1:2 | 59 | 3.2 | —$^C$ | 0.014 |
| P2 | methyl isobutyl ketone | 1:2 | 61 | 0.2 | —$^C$ | 0.003 |
| P3 | methyl isobutyl ketone | 1:1 | 76 | 66.28 | 27.7 | 0.494 |
| P4 | 1-octanol | 1:1 | 73$^A$ | 0.2 | 40.8 | 0.003 |
| P5 | methyl isobutyl ketone/ 1-octanol 7:3 | 1:1 | 82 | 10.3 | 5.6 | 0.001 |
| P6 | methyl isobutyl ketone/n-butyl acetate 3:7 | 1:1 | 74 | 41.0 | 31.5 | 0.364 |
| P8 | dibutyl phthalate | 1:1 | 80$^B$ | — | — | — |
| P9 | toluene | 1:2 | 65$^B$ | — | — | — |

$^A$more than 30% of the particles obtained are agglomerated
$^B$more than 80% of the particles obtained are agglomerated - no BET analysis was conducted
$^C$not analyzable Example 2 a) 2,3:4,5-Di-O-isopropylidene galactaric acid bis(6-aminohexyl)amide 9.55 g (0.03 mol) of 2,3:4,5-di-O-isopropylidene galactaric acid dimethyl ester (see 1b) dissolved in 100 ml of methanol are rapidly added to a solution of 34.86 g (0.3 mol) of 1,6-diaminohexane in 150 ml of methanol at room temperature with stirring and stirred under reflux for 6 hours. Then the reaction mixture is cooled to ambient temperature and evaporated to dryness. Excess 1,6-diaminohexane is distilled off at 62° C. (10$^{-3}$ mbar). The pure 2,3:4,5-di-O-isopropylidene galactaric acid bis(6-aminohexyl)amide is obtained as a clear, pale yellow, viscous distillation residue with 98% of theory (14.3 g).

MW: 486.66; Mp. 107-108° C.; $R_f$ 0.35 (CHCl$_3$/MeOH/NEt$_3$ 1:3:0.2); $\delta_H$ (200 MHz; CDCl$_3$): 6.71-6.55 (bs, 2H, CONH), 4.68 (d, 2H, J=7.04, CH—CH—CO), 4.43 (d, 2H, J=6.84 CH—CH—CO), 3.27-3.14 (m, 4H, CONH—CH$_2$), 2.61 (t, 4H, J=6.85 CH$_2$—NH$_2$), 1.44 (s, 6H, CH$_3$), 1.36 (s, 6H, CH$_3$), 1.51-1.18 (m, 16H, CH$_2$/4H, NH$_2$); $\delta_C$ (200 MHz; CDCl$_3$): 170.60 (2C, CO), 110.61 (2C, C$_q$), 78.60 (2C, CH—CH—CO), 74.84 (2C, CH—CH—CO), 41.98 (2C, CH$_2$—NH$_2$), 38.74 (2C, (2C, CONH—CH$_2$), 33.50 (2C, CH$_2$—CH$_2$—NH$_2$), 29.42 (2C, CONH—CH$_2$—CH$_2$), 26.65, 25.88 (4C, CH$_2$), 26.60, 26.67 (4C, CH$_3$).

b) Production of 2,3:4,5-di-O-isopropylidene galactaric acid bis-[(6-(2-methylacrylamino)hexyl]amide A solution of 10 g of diamine 3 (0.021 mol), 22 mg (0.1 mmol) of 2,6-di-tert-butyl-4-methylphenol in 100 ml of anhydrous pyridine is heated to 65° C. with stirring, and methacrylic acid anhydride (8.3 g, 0.053 mol) is slowly added dropwise. The reaction mixture is stirred at 65° C. for further 4 hours, then 40 ml of water are added quickly, and the reaction mixture is stirred for further 14 hours. The reaction solution is extracted three times with diethyl ether, the combined organic phases are washed twice with water, dried over Na$_2$SO$_4$, filtered and concentrated. After precipitation in 200 ml of n-hexane, filtration, washing with n-hexane and drying at room temperature, 11.3 g (86%) of pure dimethacrylamide 11 are obtained.

MW: 622.79; $\delta_H$ (200 MHz; CDCl$_3$): 7.29-7.08 (bs, 2H, C(CH$_3$)=CH$_2$—CONH), 6.88-6.67 (bs, 2H, CH—CONH), 5.72, 5.32 (2s, 4H, C(CH$_3$)=CH$_2$), 4.62 (d, 2H, J=7.09 Hz, CH—CH—CO), 4.37 (d, 2H, J=7.09 Hz, CH—CH—CO), 3.35-3.05 (m, 8H, NH—CH$_2$), 1.89 (s, 6H, C(CH$_3$)=CH$_2$), 1.64-1.51 (m, 8H, NH—CH$_2$—CH$_2$), 1.43, 1.38 (2s, 12H, CH$_3$), 1.34-1.26 (m, 8H, CH$_2$); $\delta_C$ (200 MHz; CDCl$_3$): 172.12 (2C, CO—C(CH$_3$)=CH$_2$), 168.95 (2C, CO—CH), 140.31 (2C, C(CH$_3$)=CH$_2$), 121.58 (2C, C(CH$_3$)=CH$_2$), 110.83 (2C, C$_q$), 78.52 (2C, CH—CH—CO), 74.80 (2C, CH—CH—CO), 40.65 (2C, CH—CONH—CH$_2$), 38.98 (2C, CH$_2$—NHCO—C(CH$_3$)=CH$_2$), 30.23, 26.46 (4C, CH$_2$), 18.50 (2C, C(CH$_3$)=CH$_2$).

c) Suspension Polymerization of 2b)

The procedure of example 1e) is repeated, except that the monomer 2b is used. Depending on the porogenic agent used, yields of 60 to 85% of the polymer are obtained with BET surface areas of 0.5 to 70.6 m²/g.

d) Hydrolysis of the Isopropylidene Protective Groups 8 g of polymer particles from 2c) are suspended in 65 ml of 60% acetic acid, mechanically stirred for 4 hours at 60° C., then washed with 300 ml of water and 300 ml of methanol, extracted on a soxhlet extractor for 12 hours with 150 ml of methanol, and finally dried in high vacuum to a constant weight.

Yield: 8 g

The invention claimed is:

1. A method for producing polymeric carriers based on polyacrylic or polymethacrylic amides of monosaccharides, wherein acrylic or (meth)acrylic amide derivatives of carbohydrates of the general formula I

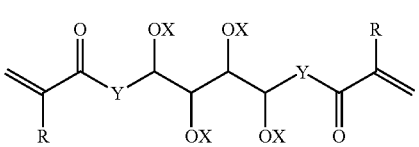

wherein R represents hydrogen or a CH$_3$ group,
and at least one X represents a group —CO—CH$_3$, —CH$_2$—C$_6$H$_5$, —Si(CH$_3$)$_3$ or at least two groups X together represent the radical

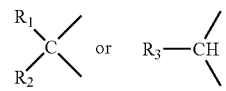

wherein $R_1$ and $R_2$ independently represent hydrogen, an alkyl radical having 1 to 10 C atoms or an aromatic radical, $R_3$ represents a cycloalkyl radical having 4 to 10 C atoms or a phenyl radical, and the other X represent hydrogen, wherein Y represents the radical —NH—, —$CH_2$—NH— or —CO—$NR_4$—Z—$NR_5$—, wherein Z represents a radical —$(CH_2)_n$—, with n=2-20, a radical —$(CH_2$—$CH_2$—O$)_x$—$CH_2$—$CH_2$—, with x=1-10, a cycloalkylidene radical having 4-10 C atoms or an aromatic radical having 6 to 30 C atoms, and wherein $R_4$ and $R_5$ independently represent hydrogen, an alkyl radical having 1 to 10 C atoms or an aromatic radical, are polymerized, optionally in the presence of pore-forming additives, followed by a partial or complete cleavage of the protective groups from the cross-linked carrier thus obtained.

2. The method according to claim 1, wherein 2,3:4,5-di-O-isopropylidene galactaric acid N,N'-bis-[2-(2-methylacrylamino)ethyl]amide is the (meth)acrylic amide carbohydrate derivative polymerized.

3. The method according to claim 1, wherein 2,3:4,5-di-O-isopropylidene galactaric acid N,N'-bis-[6-(2-methylacrylamino)hexyl]amide is the (meth)acrylic amide carbohydrate derivative polymerized.

4. The method according to claim 1, wherein 2,3:4,5-di-O-isopropylidene galactaric acid N,N'-bis-[12-(2-methylacrylamino)dodecyl]amide is the (meth)acrylic amide carbohydrate derivative polymerized.

5. The method according to any of claims 1 to 4, wherein mixtures of mono- and disubstituted (meth)acrylic amide derivatives of carbohydrates are polymerized.

6. The method according to any of claims 1 to 4, wherein additionally co-monomers are polymerized.

7. The method according to claim 6, wherein acrylamide, methacrylamide, N-methylolacrylamide, N-methyl-N-((2,2-dimethyl-1,3-dioxolane-4-yl)methyl)acrylamide or N-methyl-N-(2,2-dimethyl-1,3-dioxolane-4-yl)methyl)methacrylamide are polymerized as co-monomers.

8. The method according to claim 6, wherein 2-hydroxyethyl acrylate, 2-hydroxyethyl methacrylate, ethylene glycol diacrylate, ethylene glycol dimethacrylate, diethylene glycol monoacrylate, diethylene glycol monomethacrylate, glycidyl acrylate, glycidyl methacrylate or N,N-dimethylaminoethylmethacrylate are polymerized as co-monomers.

* * * * *